(12) United States Patent
Meireson et al.

(10) Patent No.: US 11,659,100 B2
(45) Date of Patent: May 23, 2023

(54) PRINT PRODUCT MANAGEMENT SYSTEM

(71) Applicants: Baldewin Meireson, Ghent (BE); Cindy Cooperman, Marietta, GA (US)

(72) Inventors: Baldewin Meireson, Ghent (BE); Cindy Cooperman, Marietta, GA (US)

(73) Assignee: ESKO SOFTWARE BVBA, Ghent (BE)

( * ) Notice: Subject to any disclaimer, the term of this patent is extended or adjusted under 35 U.S.C. 154(b) by 0 days.

(21) Appl. No.: 17/621,595

(22) PCT Filed: Jun. 22, 2020

(86) PCT No.: PCT/US2020/038995
§ 371 (c)(1),
(2) Date: Dec. 21, 2021

(87) PCT Pub. No.: WO2020/257788
PCT Pub. Date: Dec. 24, 2020

(65) Prior Publication Data
US 2022/0360672 A1 Nov. 10, 2022

Related U.S. Application Data

(60) Provisional application No. 62/864,931, filed on Jun. 21, 2019.

(51) Int. Cl.
*H04N 1/00* (2006.01)
(52) U.S. Cl.
CPC ............................ *H04N 1/00031* (2013.01)
(58) Field of Classification Search
None
See application file for complete search history.

(56) References Cited

U.S. PATENT DOCUMENTS

| 7,034,960 | B2 | 4/2006 | Stone et al. | |
| 2002/0193956 | A1* | 12/2002 | Van de Capelle | ..... G01N 33/32 |
| | | | | 702/81 |

(Continued)

FOREIGN PATENT DOCUMENTS

| CN | 1498390 | 5/2004 |
| CN | 102171052 | 8/2011 |

(Continued)

OTHER PUBLICATIONS

International Preliminary Report on Patentability regarding PCT/US2020/038995, dated Dec. 21, 2021 (7 pgs.).

(Continued)

*Primary Examiner* — Lennin R Rodriguezgonzalez
(74) *Attorney, Agent, or Firm* — Hahn Loeser & Parks LLP

(57) ABSTRACT

A method of producing a printed product includes creating a project specification and storing the it on a server, the project specification including a palette of selected master colors, a printing substrate, a printing technique, and an ink base for a printed product; determining whether a quality assurance color is available for each master color, for master colors having an associated quality assurance color, automatically associating quality assurance color information with the master colors; generating a quality assurance package corresponding to the project specification, the quality assurance package including the quality assurance color information; providing a converter with access to the project specification and the quality assurance package; the converter producing the printed product according to the project specification and scoring the printed product against the quality assurance package; and receiving from the converter a score indicative of the printed product's appearance measured against the quality assurance color information.

13 Claims, 19 Drawing Sheets

(56) References Cited

U.S. PATENT DOCUMENTS

| | | |
|---|---|---|
| 2006/0002323 A1 | 1/2006 | Hildebrand et al. |
| 2007/0291289 A1* | 12/2007 | Kuo ................... H04N 1/6055 358/1.9 |
| 2009/0038977 A1 | 2/2009 | Tilton |
| 2010/0067056 A1 | 3/2010 | Rich et al. |
| 2012/0140289 A1* | 6/2012 | Lachajewski ...... H04N 1/00031 358/3.01 |
| 2017/0021638 A1 | 1/2017 | Barndt et al. |

FOREIGN PATENT DOCUMENTS

| | | |
|---|---|---|
| CN | 102439963 | 5/2012 |
| CN | 104040520 | 6/2017 |
| CN | 107009734 | 8/2017 |
| CN | 107042689 | 8/2017 |
| WO | 2010100568 | 9/2010 |

OTHER PUBLICATIONS

International Search Report regarding PCT/US2020/038995, dated Aug. 31, 2020 (2 pgs.).
Written Opinion of the International Searching Authority regarding PCT/US2020/038995, dated Aug. 31, 2020 (2 pgs.).
Chinese Office Action related to application No. 202080058981.9, dated Feb. 13, 2023 (10 pgs.).
Microsoft Translator machine translation of Chinese Office Action related to application No. 202080058981.9, dated Apr. 6, 2023 (15 pgs.).

* cited by examiner

JOB DATA — 40

| | | |
|---|---|---|
| Brand | Brand A | Type Can | Quant. 500,000 |
| Sub Brand | Diet Brand A | Material Metal 124 | Region EU |
| Due Date | 12/12/2019 | Contact Joe Smith | Descr. New Year |
| Converter | BEMIS | | |

*Add Color*

COLOR DATA — 38

- 32 — Brand A Red — M124-BE
- 34a — Brand A Silver — M124-BE
- 32, 34 — Brand A White — M124-BE
- Brand A Black — M124-BE
- Brand A Black — M124-BE

DESIGN — 42
☑ Approved
☑ Preflight

ARTWORK — 44
☑ Approved

FIG. 12

PRINT PRODUCT MANAGEMENT SYSTEM

RELATED APPLICATIONS

This application is a National Phase filing of international patent application PCT/US2020/038995, filed Jun. 22, 2020 which claims benefit of provisional application U.S. Ser. No. 62/864,931, filed Jun. 21, 2019 the entirety of both of which are incorporated by reference.

BACKGROUND

Color management in the design, specification and production of retail packaging and other printed materials is highly important to owners of retail brands ("brand owners"). Colors affect perceptions and behaviors of consumers with respect to brands and retail products and influence consumers to consider specific brands or make a purchase. Accordingly, a brand's color may be just as important to driving retail sales, if not more important, than a brand's logo or name. Accordingly, great emphasis is put on accurately reproducing a brand's color on retail packaging regardless of substrate (paperboard, metallic can, plastic label) and other printing conditions.

One of the goals of color management is aligning production capabilities with the expectations of brand owners. To do this, production colors may be measured by spectrophotometers or other color measurement instruments, and reports on color accuracy reported back to a purchaser. However, existing processes for communicating color requirements and reporting color quality assurance measurements in achieving the color requirements require manual effort and may be subject to error and delay.

SUMMARY

A method of producing a printed product according to a project specification includes creating a project specification and storing the project specification on a server, the project specification including a palette of selected master colors, a printing substrate, a printing technique, and an ink base for a printed product; determining whether a quality assurance color is available for each master color; for master colors having an associated quality assurance color, automatically associating quality assurance color information with the master colors; generating a quality assurance package corresponding to the project specification, the quality assurance package including the quality assurance color information; providing a converter with access to the project specification and the quality assurance package; the converter producing the printed product according to the project specification and scoring the printed product against the quality assurance package; and receiving from the converter a score indicative of the printed product's appearance measured against the quality assurance color information in the quality assurance package. As the printed product is being measured against the quality assurance color information, the quality assurance package may exclude the master colors in the palette of selected master colors.

The server may perform the step of automatically associating quality assurance color information with the master colors. The quality assurance color may comprise a production color previously generated by the converter. The step of automatically associating quality assurance color information may comprise associating color space values or spectral information for the quality assurance colors with the master colors. The quality assurance color may comprise a dependent standard color hosted in a separate database. The step of automatically associating quality assurance color information may comprise associating a reference to where color space values or spectral information for the quality assurance colors may be accessed with the master color.

The method may further comprise providing access to the project specification to a pre-press operator prior to the step of generating a quality assurance package. The pre-press operator may perform the step of automatically associating quality assurance color information with the master colors.

The step of receiving from the converter a score may further comprise the converter uploading the score to a score server separate from the server; and the server accessing the score server and retrieving the score.

The method may further comprise the step of the server automatically generating a request for a new quality assurance color for master colors that have no corresponding quality assurance color. The method may further comprise the step of the server automatically checking that a design uploaded to the project specification only includes colors from the palette of selected master colors.

The method may further comprise the steps of: providing a designer with access to the project, including the palette of selected master colors; receiving from the designer a product design; and verifying the product design uses only the colors in the palette of selected master colors.

BRIEF DESCRIPTION OF THE DRAWINGS

FIG. 12 is a representation of a screen display illustrating identification of absent production colors according to another aspect of the present invention.

DETAILED DESCRIPTION

Figure 1:
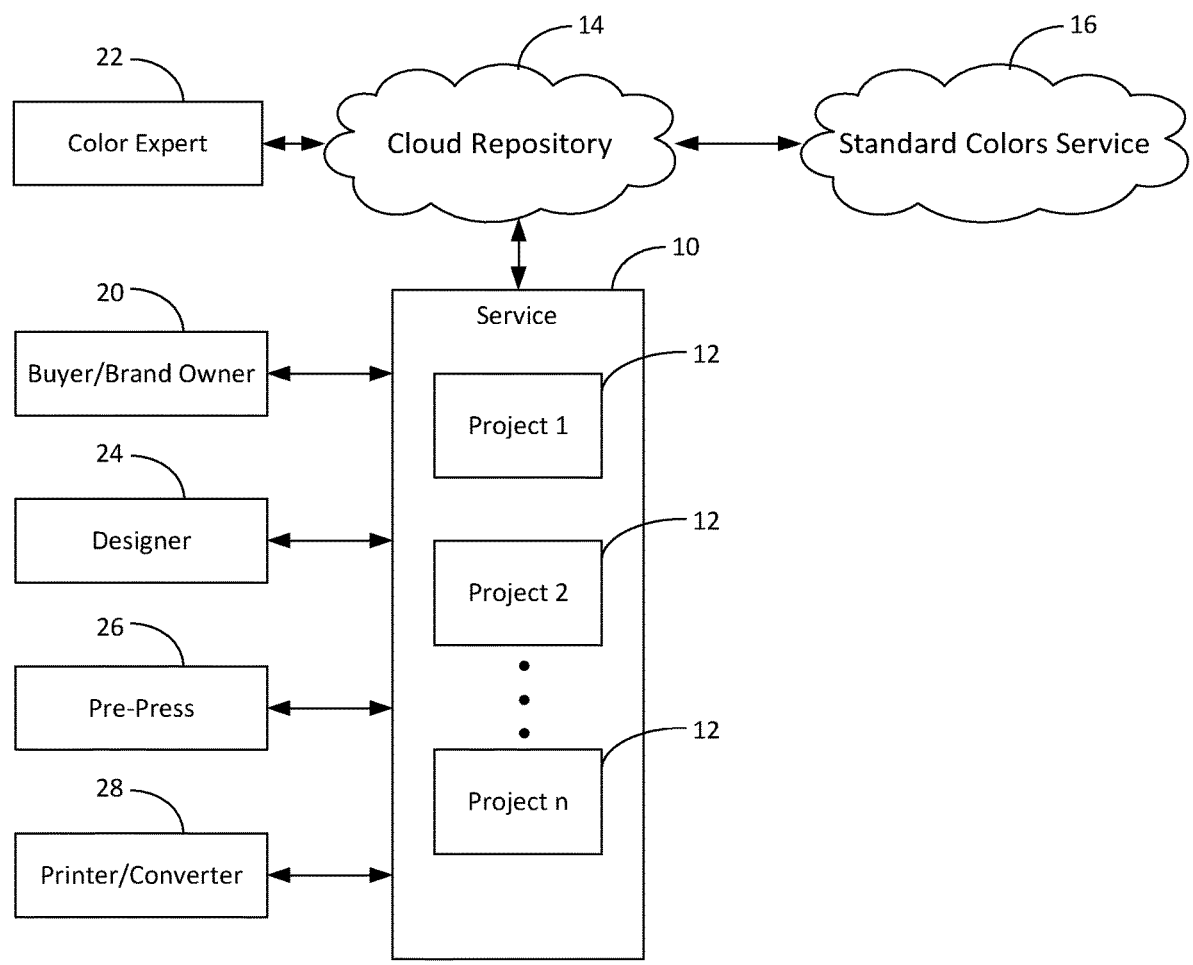
FIG. 1 is a block diagram of a system according to the present invention and parties and other services which interact with the system.

Referring to FIG. 1, a server is provided hosting Print Product Project Management System 10 ("System"). The System 10 is used as a hub in an integrated workflow to generate printing information and products for producing a color printed product with an associated Quality Assurance Package 80. The color printed product may, for example, comprise packaging or labeling for a retail product. A color printed product may comprise, for example, a printed paper product, a printed metal product, a printed plastic film product, a printed adhesive label, or a combination thereof.

In some embodiments, the System 10 comprises a cloud-based Software as a Service (SaaS) system. In some embodiments, the System 10 comprises a dedicated physical server or a virtual server. In some applications, the System 10 is comprises a tenant in an application hosted in a Platform as a Service (PaaS). In some applications, the PaaS is hosted in Infrastructure as a Service (IaaS). The System 10 may be accessed by various client computing devices operated, for example, by a Color Expert 22, a Buyer or Brand Owner 20, a Designer 24, a Pre-press Operator 26, and a Printer or Converter 28. The System 10 may be accessed via the Internet, WAN, LAN, or other computing network.

A Project 12 is created on the System 10 for each product to be printed. As illustrated in FIGS. 2-16, the Project 12 is a specification which includes various items of information, including information concerning materials and desired colors for the finished printed product. In some embodiments, the colors include or are based on Master Colors 32. Master Colors 32 may comprise spectral data or physical reference color chips. Examples of Master Colors 32 include commercial libraries of standardized colors, such as Pantone Matching System libraries. Brand owners may also have libraries of proprietary Master Colors 32 associated with their brands. Master Colors 32 may be specified without reference to printing conditions, such as printing process, substrate, and ink system.

In some embodiments, Master Colors 32 are associated with Production Colors 34. Production Colors 34 typically comprise measured color or spectral information reflecting an attempt to match its associated Master Color 32 as closely as reasonably possible by a printer or Converter 28. Typically, some measurable variation exists between a Master Color 32 and a Production Color 34 due to limitations based on printing conditions. A Production Color 34 may be particular to a single printer/converter, ink system, ink manufacturer, ink recipe, print process, printing press, and other printing conditions. A Printer or Converter 28 may supply color space values or spectral information of a Production Color 34 to a Buyer 20, who may then store the information in the System 10 or in an "Ink Book" hosted in a cloud repository 14. The Buyer 20 may associate the Production Color 34 to a Master Color 32 in the System 10. Individual Converters 28 may store such information for repeat jobs, but such detailed printing conditions information heretofore was not typically provided to a Brand Owner or other Buyer.

In some embodiments, Master Colors 32 are associated with Dependent Standard Colors, such as in Pantone's PantoneLIVE. Dependent Standard Colors comprise color or spectral measurements of representative examples of an attempt to match a Master Color 32 using a given common printing process (e.g., Offset Lithography, Flexography, Gravure), ink system and volume (e.g., water or solvent based, medium or heavy), and typical substrate (e.g., paper, cardboard, film, aluminum can). Dependent Standard Colors are not particular to a given printer/converter, printing press, ink recipe, or other specific printing condition.

Unless expressly limited, the term "Quality Assurance Color" as used herein refers to Production Colors 34 and/or Dependent Standard Colors. Unless expressly limited, the term "Quality Assurance Color Information" as used herein refers to Production Colors 34 and/or Dependent Standard Colors themselves, or references to where such colors may be retrieved for use. Master Colors 32, Production Colors 34, and Dependent Standard Colors may comprise spectral information or values in a color space, such as CIELAB, CIEXYZ, and RGB color spaces.

Figure 2:
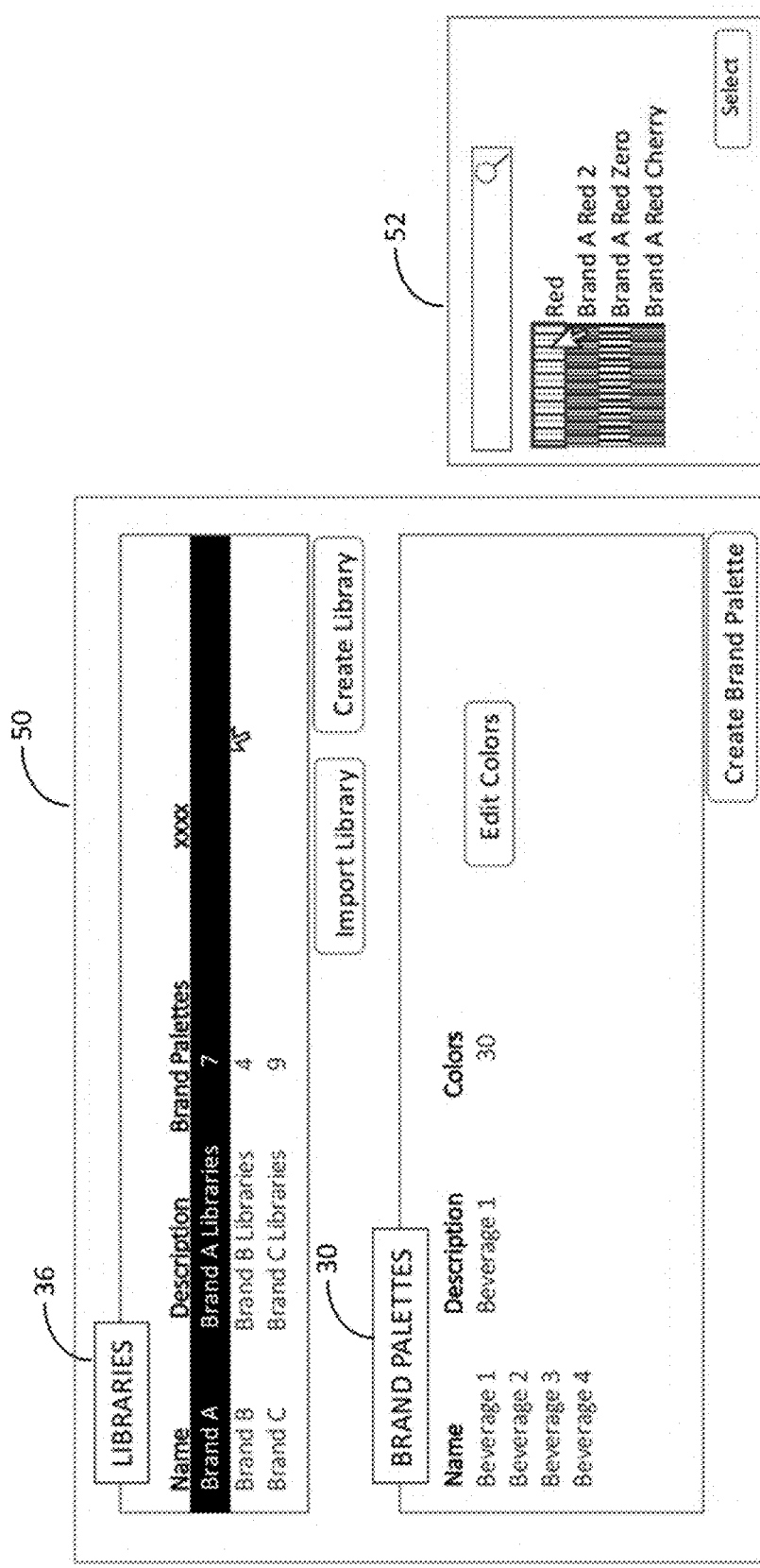
FIG. 2 is a representation of a screen display for palette selection for a project specification according to one aspect of the present invention.
Figure 3:
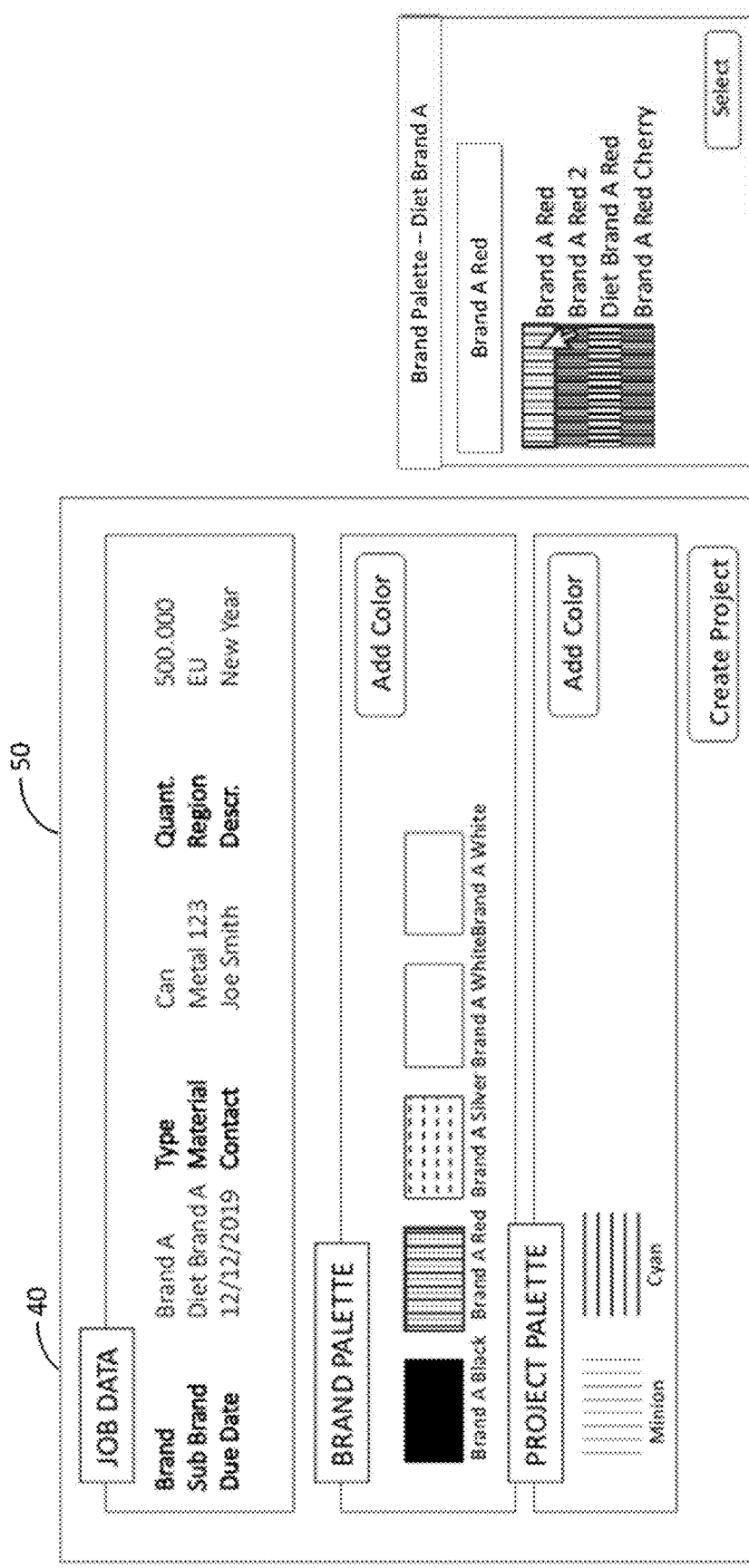
FIG. 3 is a representation of a screen display for project specification according to another aspect of the present invention.

Referring to FIGS. 2, 3, 17a and 17b, a workflow 200 for creating a printed color product is illustrated. Referring to FIGS. 2 and 3, initially, a Color Expert 22 and/or Buyer 20 accesses a display 50 of a client computing device and creates or selects 202 a Brand color Palette 30. Colors may be selected from a submenu 52. A project palette 31 may also be selected from the brand palette 30 with colors specific to a given Project 12. Alternatively, the project palette may comprise process colors. The Palettes 30, 31 comprise Master Colors 32. Palettes 30, 31 may be stored in one or more libraries 36, locally or in a cloud repository 14.

The Master Colors 32 may be associated with one or more pack-aged consumer goods, such as a branded good, including a sub brand or line extension. In another example, the Master Colors 32 comprise industry standard colors, such as Pantone Matching System Colors. These may also be referred to as Master Standard Colors. When a Master Color 32 is selected, associated Production Colors 34 and/or Dependent Standard Colors may be displayed. However, in other embodiments, as discussed below, Quality Assurance Colors are used only for production and quality assurance purposes. The Buyer may also add graphics to be included on the printed product to the Project 12.

Using the System 10, a Buyer 20 creates 204 a Project 12. The Buyer also selects a Palette 30, 31 of Master Colors 32 which the Buyer 20 desires to appear on the printed product specified by the Project 12. In the Project 12, the Buyer also specifies additional Job Data 40 (FIG. 3), including the type of printed product (e.g., can, box) and material (e.g., metal, and cardboard). The Buyer then grants a Designer 24 access 206 to the Project 12.

Figure 4:
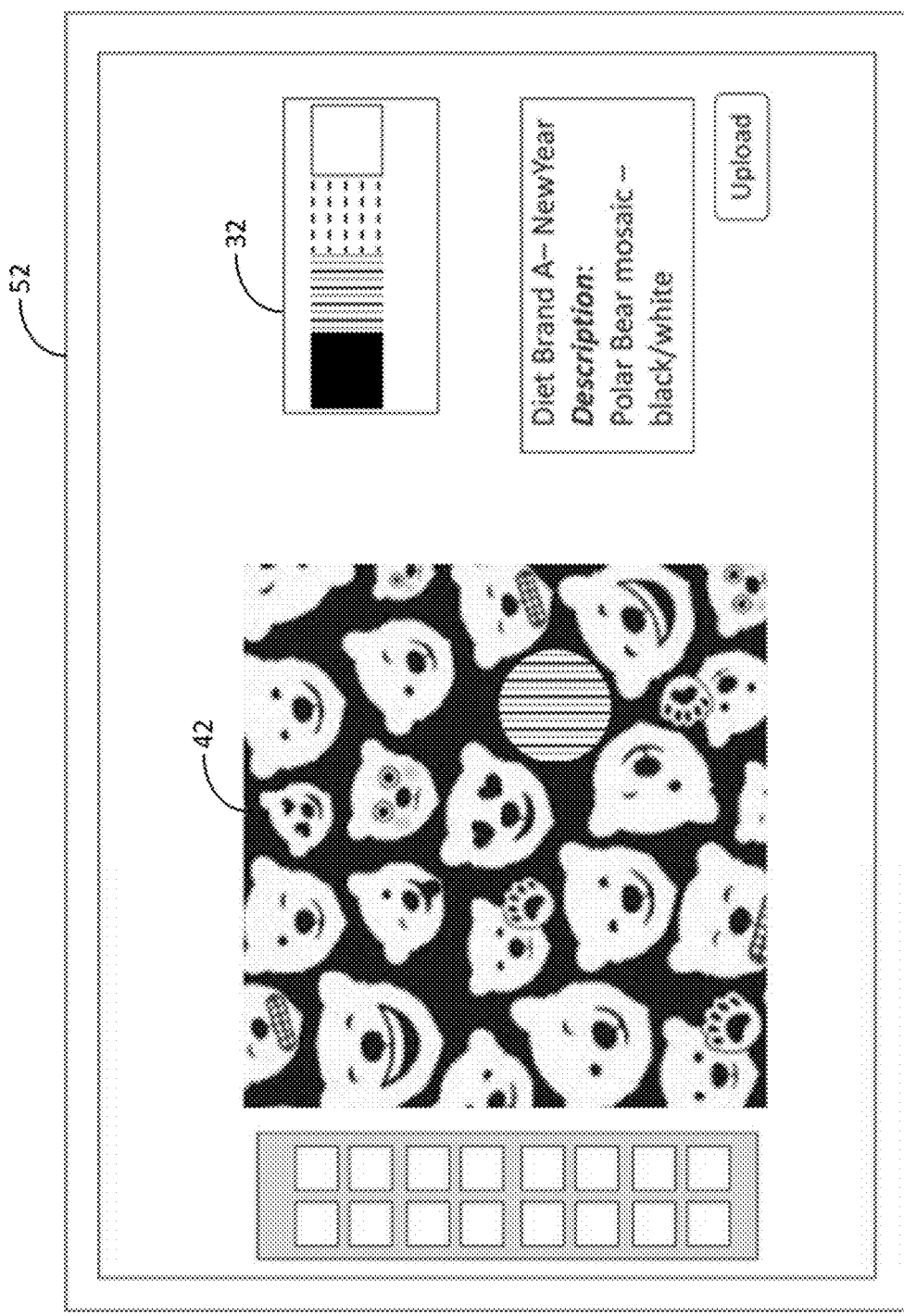
FIG. 4 is a representation of a screen display for print product design.

The Designer 24 may use any commercially available design software 52 for product design, such as Adobe Illustrator. Referring to FIG. 4, the design software accesses the Project 12 on the System 10, including the Palette 30, 31 and related graphics via a Web Connector. In some embodiments, the System 10 provides the Designer 24 with the Palette 30, 31 including just the Master Colors 32 that the Buyer selected, not an entire Library 36 of colors. In other embodiments, the System 10 associates Quality Assurance Colors with the Palette 30, 31 of Master Colors 32 so that the Designer 24 may generate a visualization of how the finished product will appear as printed. Via WebCenter Connector, graphical data can be opened and other information on the job such as type of product to be designed is provided. When the Designer 24 finishes his/her work, the resulting Design 42 is uploaded 208 back to the Project 12 on the System 10.

Figure 5:
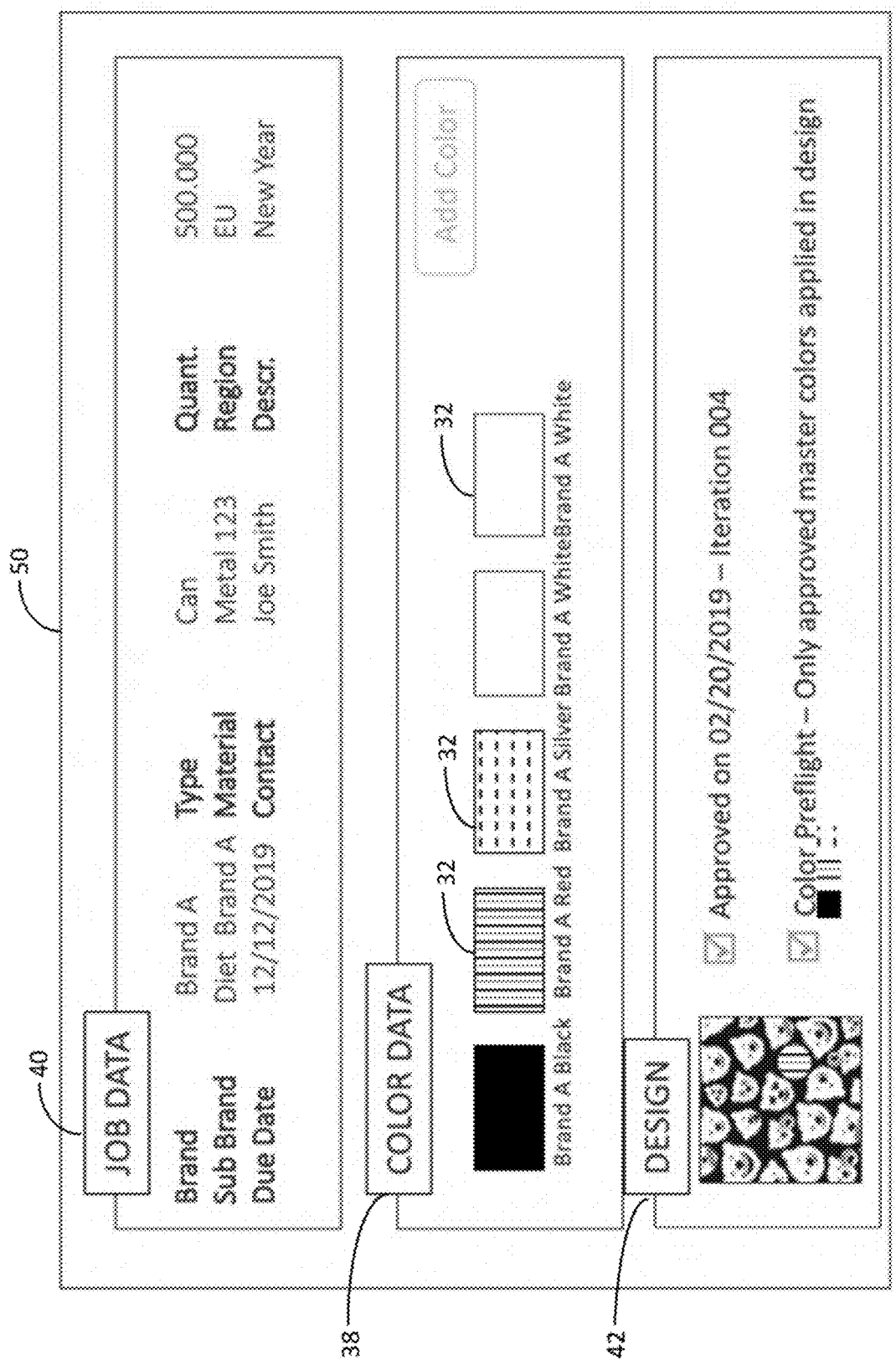
FIG. 5 is a representation of a screen display for project design approval according to another aspect of the present invention.

Referring to FIG. 5, once the Design 42 is uploaded into Project 12, the Buyer may use the System 10 to initiate a Design Approval Cycle. The Buyer 20 may then review and approve the Design 42 or request revisions. For example, the Buyer 20 may confirm that the Color Data 38 used in the Design 42 includes only the Master Colors 32 in the Brand Palette 30 and request correction if the Designer 24 used other colors. Design 42 approval is recorded in the System 10. Color Pre-flight may be automatically executed by the System 10 at his point.

Figure 6:
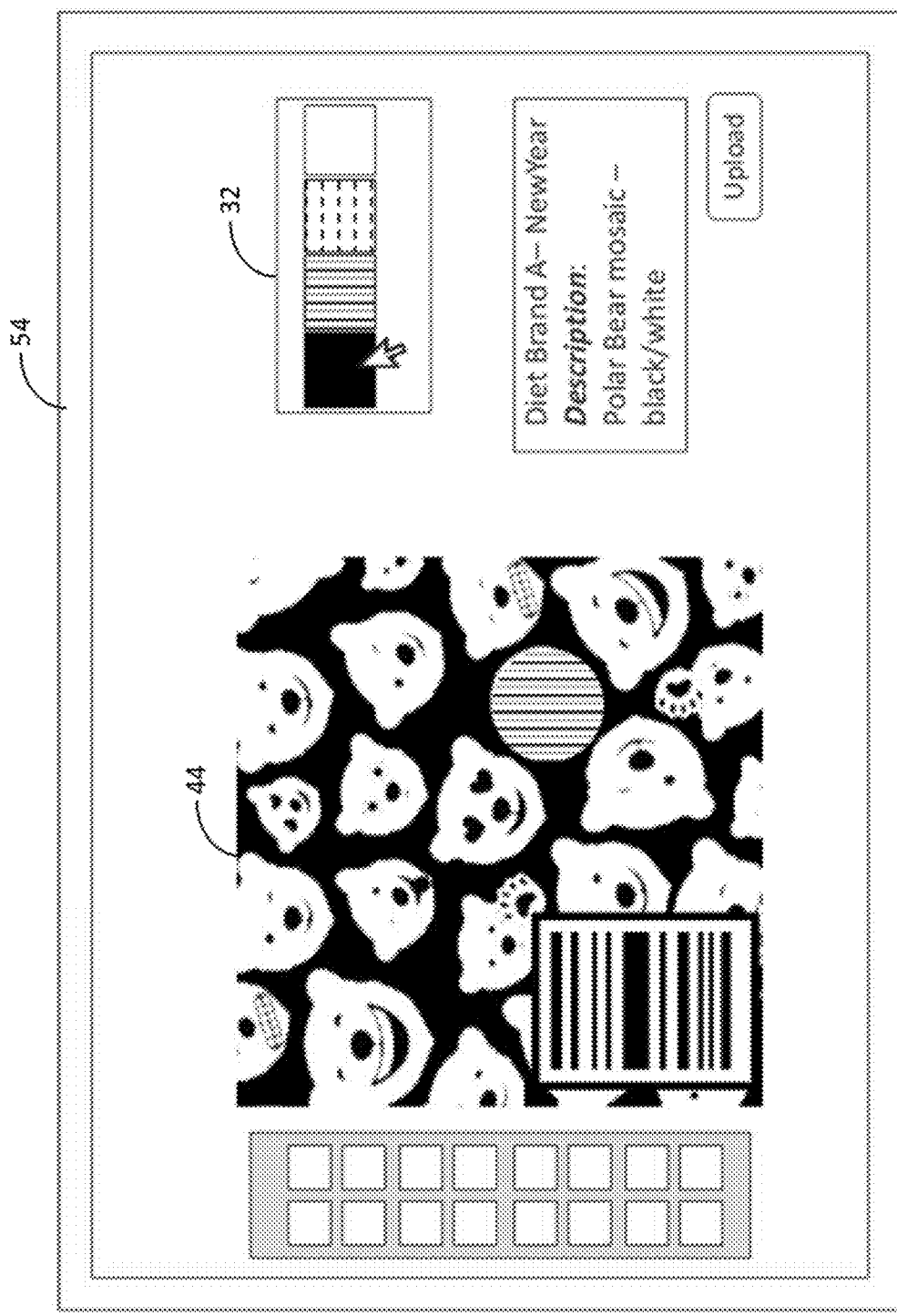
FIG. 6 is a representation of a screen display for pre-flight operations for artwork for a print product design.

Referring to FIG. 6, once the Design 42 is approved, the Buyer 20 grants access 210 to the Project 12 to a Pre-Press Operator 26. Via the Web Connector, the Pre-Press Operator 26 accesses the Design 42, including graphical data, the Brand Palette 30, 31, and other information on the job. The Pre-Press Operator 26 takes the Design 42 in pre-press software 54 and may conduct further pre-flight steps in addition to the Color Pre-flight performed by the System 10. The Pre-Press Operator 26 generates Artwork 44 for producing the printed product. Additionally, the Pre-Press Operator 26 adapts color separations according to the Design 42. The System 10 supports projects requiring formulated spot ink colors and CMYK process colors.

In some embodiments, the System 10 associates Production Colors 34 with Master Colors 32 prior to granting the Pre-Press Operator 26 access. In some embodiments, the Pre-Press Operator software tools access the Project 12 in the System 10 and associate Production Colors 34 with the Master Colors 32 in the Design 42. In other embodiments, references to Quality Assurance Colors associated with the Master Colors 32 are obtained and included with the Artwork 44. When the Pre-Press Operator 26 finishes his/her work, resulting Artwork 44 is uploaded back to the Project 12 in the System 10 via the Web Connector.

Figure 7:
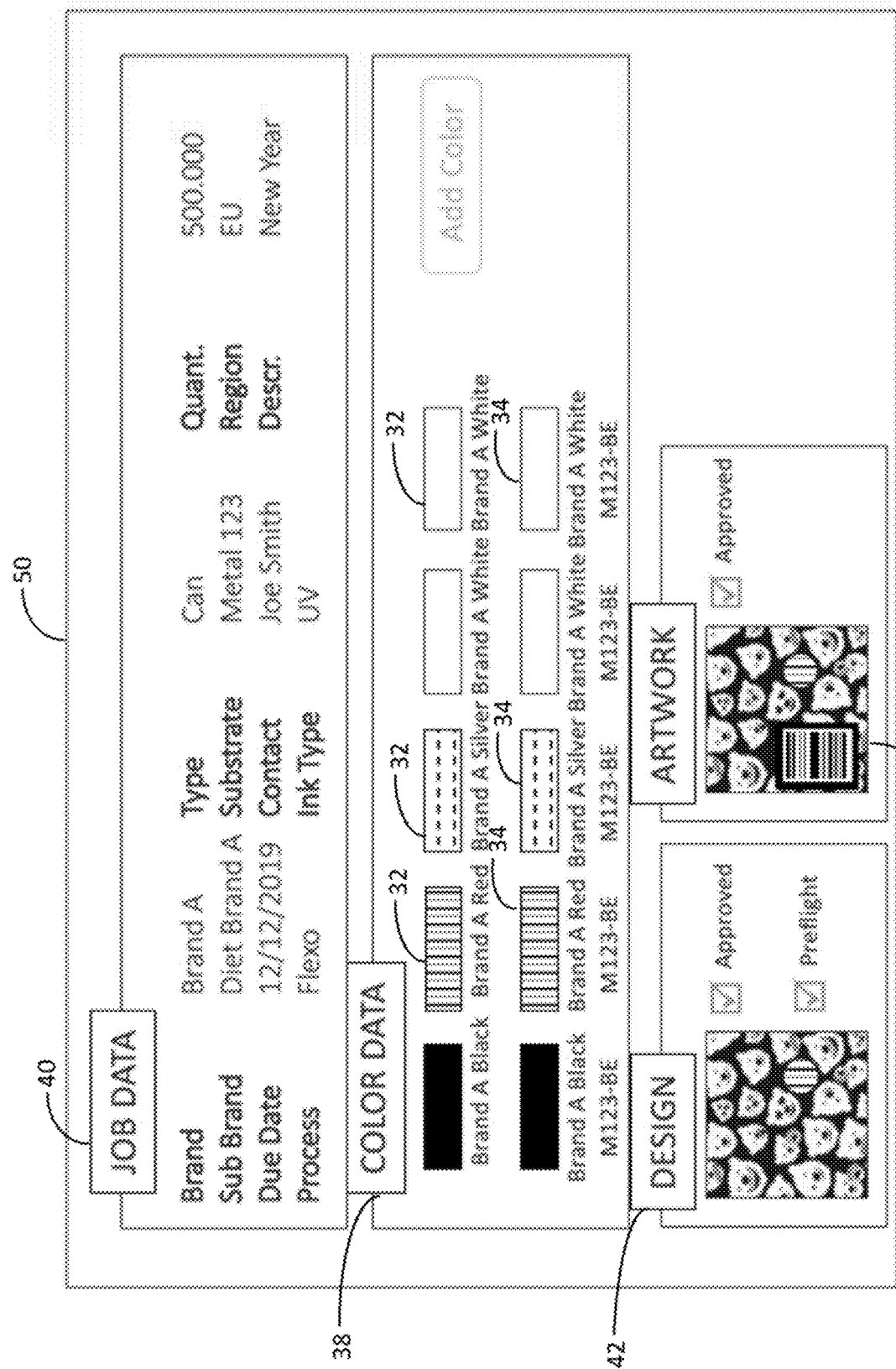
FIG. 7 is a representation of a screen display for project artwork approval according to another aspect of the present invention.

Referring to FIG. 7 once the Artwork 44 is loaded into the Project 12, if the Pre-Press Operator 26 has not already done so, the System 10 automatically checks 214 for Quality Assurance Colors and associates existing Quality Assurance Color Information with the Master Colors 32 216 in the Color Data 38. For example, depending on the requirements of the Project 12, Production Colors 34 and/or Dependent Standard Colors are associated with the Master Colors 32. Production Colors 34 may be stored in a cloud repository 14 accessible by the System 10 in a custom "ink book" which is proprietary to a Buyer. Production Colors 34 may also be stored in a private library in a color standards or color reference service 16, such as PantoneLIVE. This may be necessary when the Production Color 34 is based on a Master Standard Color. Dependent Standard Colors may also be stored in a library of reference colors and accessed through a link to a color reference service 16.

In the example of FIG. 7 Job Data 40 indicates that the substrate is metal can ("Metal 123"), printing process is Flexographic ("Flexo"), and ink base is an ultraviolet ("UV") curing ink. The Master Colors 32 are displayed in a first row of Color Data 38 and Quality Assurance colors, such as Production Colors 34, are displayed in a second row of Color Data 38, along with Quality Assurance Color identifiers ("M123-BE"). In some embodiments, the System 10 further takes into account the particular Converter 28 who will print the product when selecting Production Colors 34. In some embodiments the System 10 generates visual comparisons between the Master Color 32 and Quality Assurance Colors to show any slight differences due to printing conditions impact. The Buyer 20 may initiate an Artwork Approval Cycle. A record of acceptance of the Artwork 44 is maintained by the System 10 in the Project 12.

Figure 8:
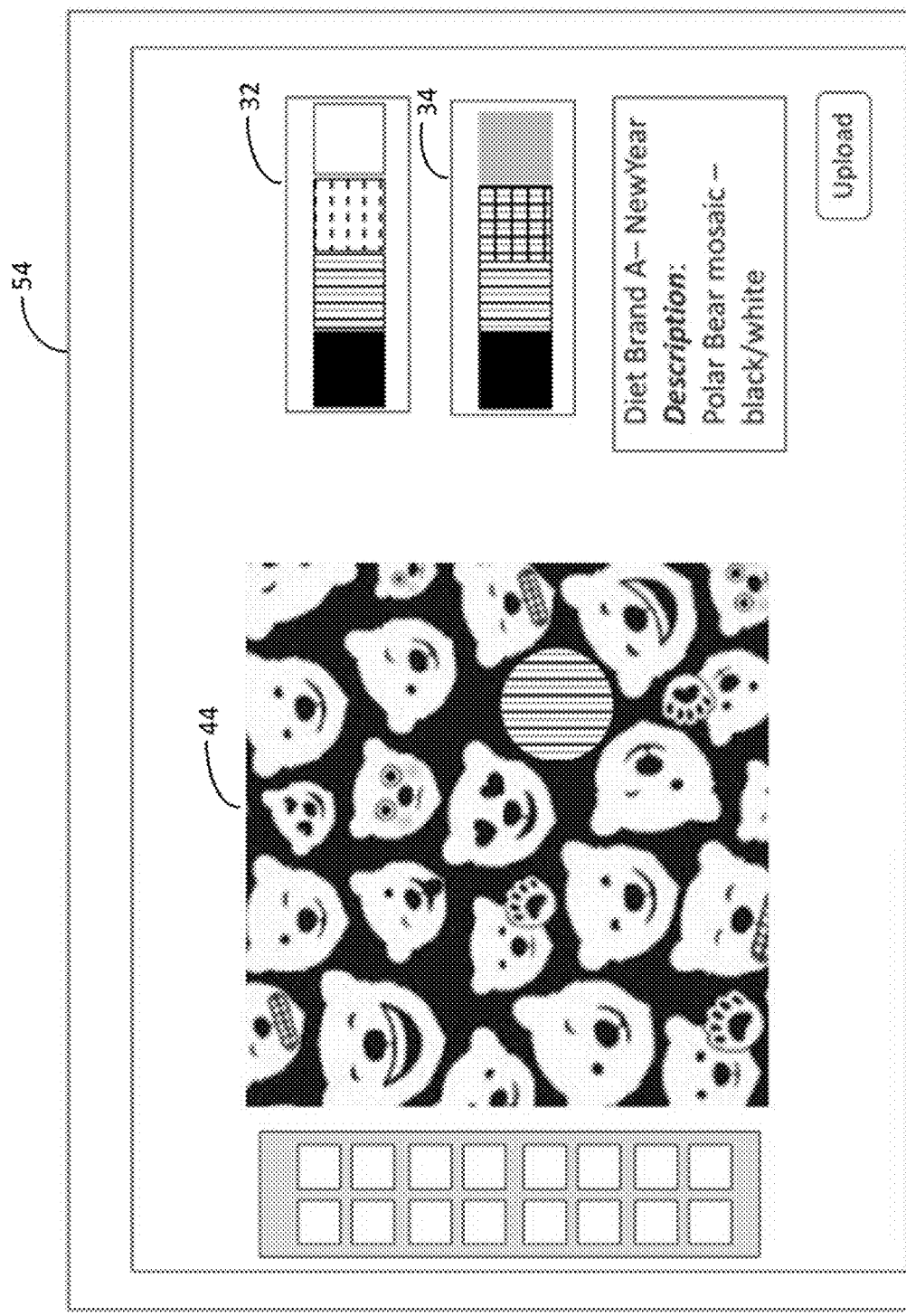
FIG. 8 is a representation of a screen display for pre-press operations.

Referring to FIG. 8, once the Artwork 44 is approved, the Pre-Press Operator 26 receives 224 the Quality Assurance Color Information along with other information in the Project 12 via the Web Connector. Any of the conventional steps 226 of Pre-Press may occur at this stage. For example, final production separations are prepared. These represent the printing plates. In some embodiments, when the Pre-Press Operator 26 finishes his/her work, the resulting Pre-press Ready Job 46 is uploaded back to the Project 12. In some embodiments, the Pre-Press Ready Job 46 is stored 228 on computer facilities used by the Converter 28 or Pre-media.

Figure 9:
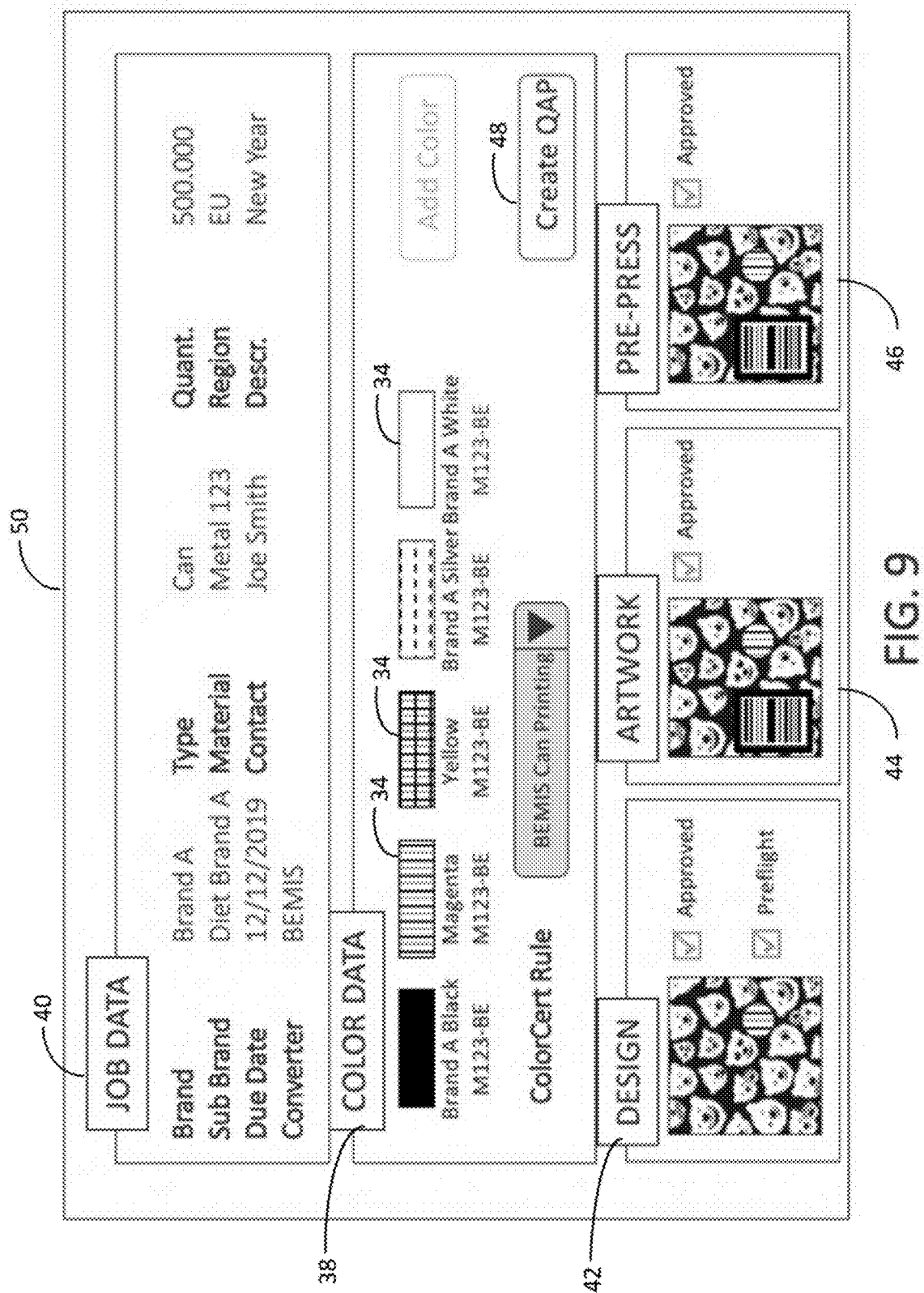
FIG. 9 is a representation of a screen display for project pre-press approval according to another aspect of the present invention.

Referring to FIG. 9, the System 10 uses available metadata, Color Data 38 and color measurement rules to create 220 a full Quality Assurance Package 80. This may be done automatically by System 10 upon actuation of a display button 48. An example of a Quality Assurance Package 80 is a ColorCert Job, such as is produced by X-Rite ColorCert software. The Quality Assurance Package 80 is made available to the Printer 222. The Pre-press Ready Job 46 is approved and ready for production. The combination of the Quality Assurance Package 80 and Pre-press Ready Job 46 comprise a complete Product Specification.

Figure 10:
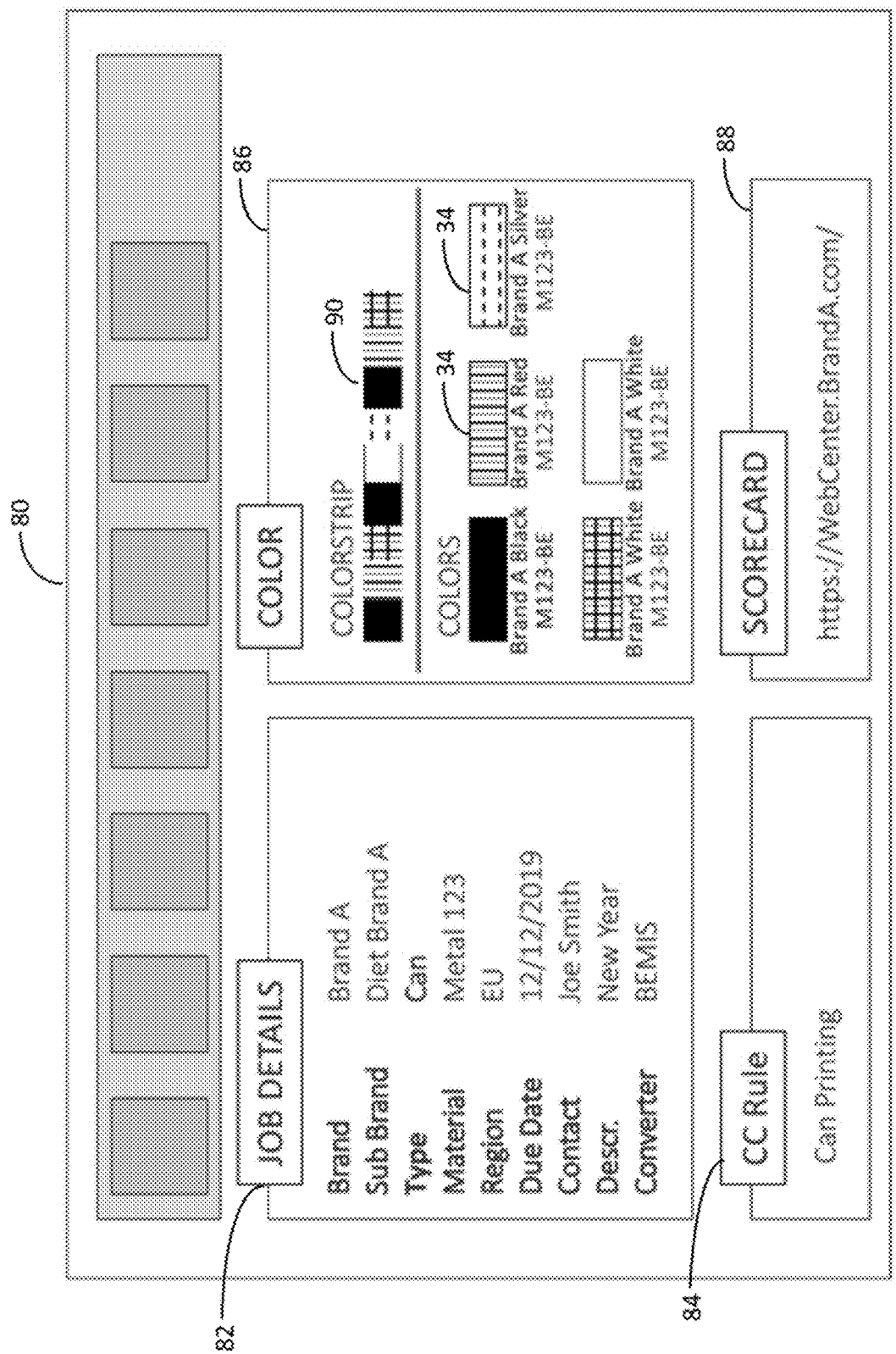
FIG. 10 is a representation of a screen display for generating a quality assurance package for a project according to another aspect of the present invention.

As illustrated in FIG. 10, the Quality Assurance Package 80 includes Job Details 82, such as type of printed product (e.g., can, carton, label), substrate material (e.g., metal, cardboard, plastic film), due date, description, and Converter 28. The Quality Assurance Package 80 also includes color information 86, including a color verification strip 92 to be printed for quality assurance measurements and the associated Quality Assurance Color Information which may include, in appropriate cases, definition of spot colors and/or CMYK profile or other ICC profile of the press. In some embodiments, the Quality Assurance Color Information completely replaces the Master Colors 32 and no Master Colors 32 are provided in the Quality Assurance Package 80. The Quality Assurance Package 80 also includes rules and tolerances 84 to follow when certifying that the printed product meets the Buyer's requirements, and a location 88 on the System 10 for uploading measurements and quality assurance scoring Referring to FIG. 10, the Converter 28 accesses the Quality Assurance Package 80 in the Project 12. This Quality Assurance Package 80 is loaded into the appropriate color quality assurance software. During press set up and/or production, colors produced on a printed color verification strip are measured for compliance with the color verification strip 92 specified in the Quality Assurance Package 80. For example, scanned colors may be compared with the Production Colors 34 in the Quality Assurance Package 80. The Converter 28 performs color measurements 230 and quality assurance scoring is reported 232 back to the System 10.

Figure 11:
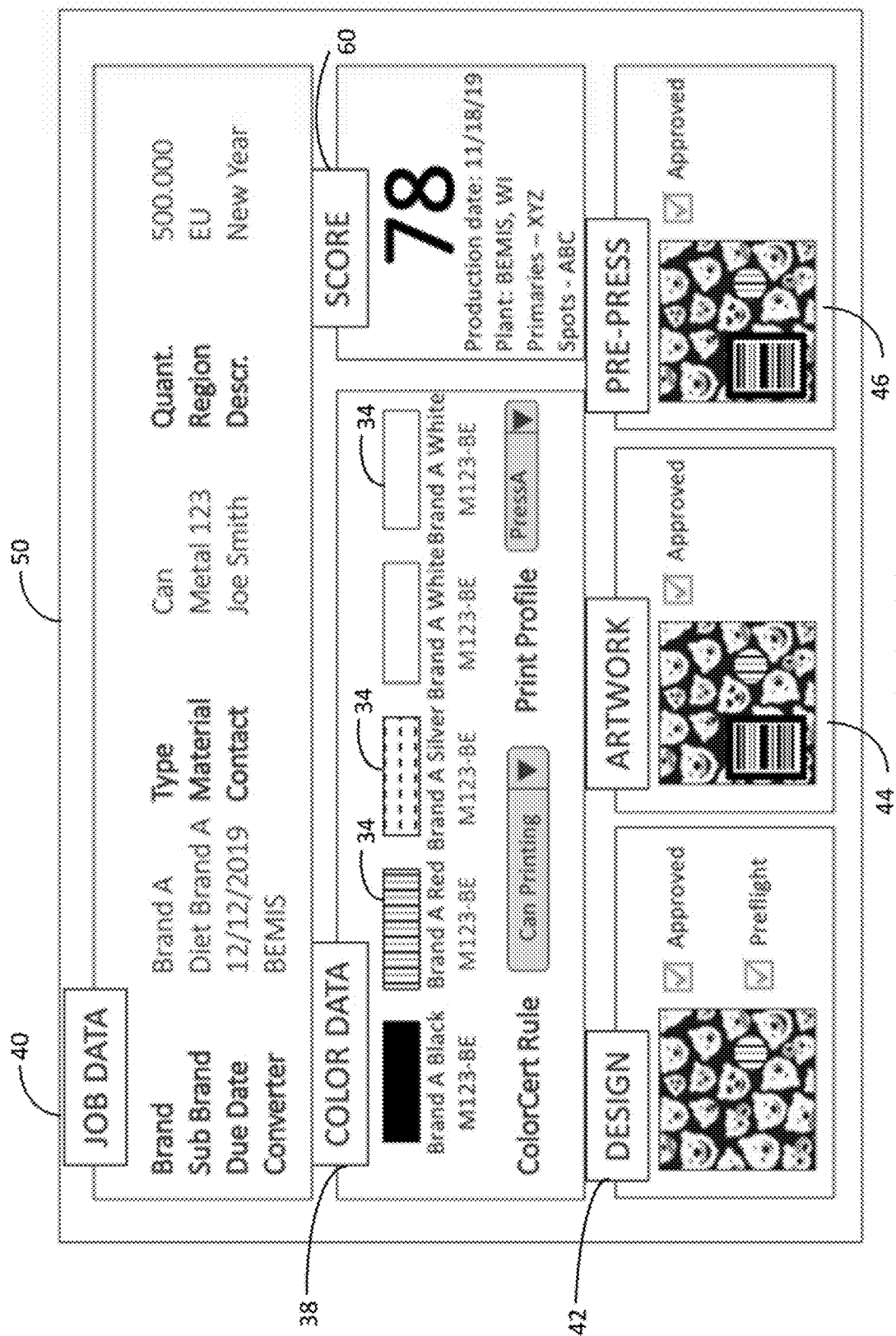
FIG. 11 is a representation of a screen display illustrating quality assurance reporting according to another aspect of the present invention.

In some embodiments, scoring information is uploaded to and stored in a Score Card server. The Score Card server then transfers the scoring information to the System 10 where it is displayed in the Project 12. Referring to FIG. 11, at least summary scoring information 60 is automatically available in the Project 12. Additional meta-data can be made available. In some embodiments, the System 10 permits a user to click-through to the Score Card server for all details.

Figure 13:
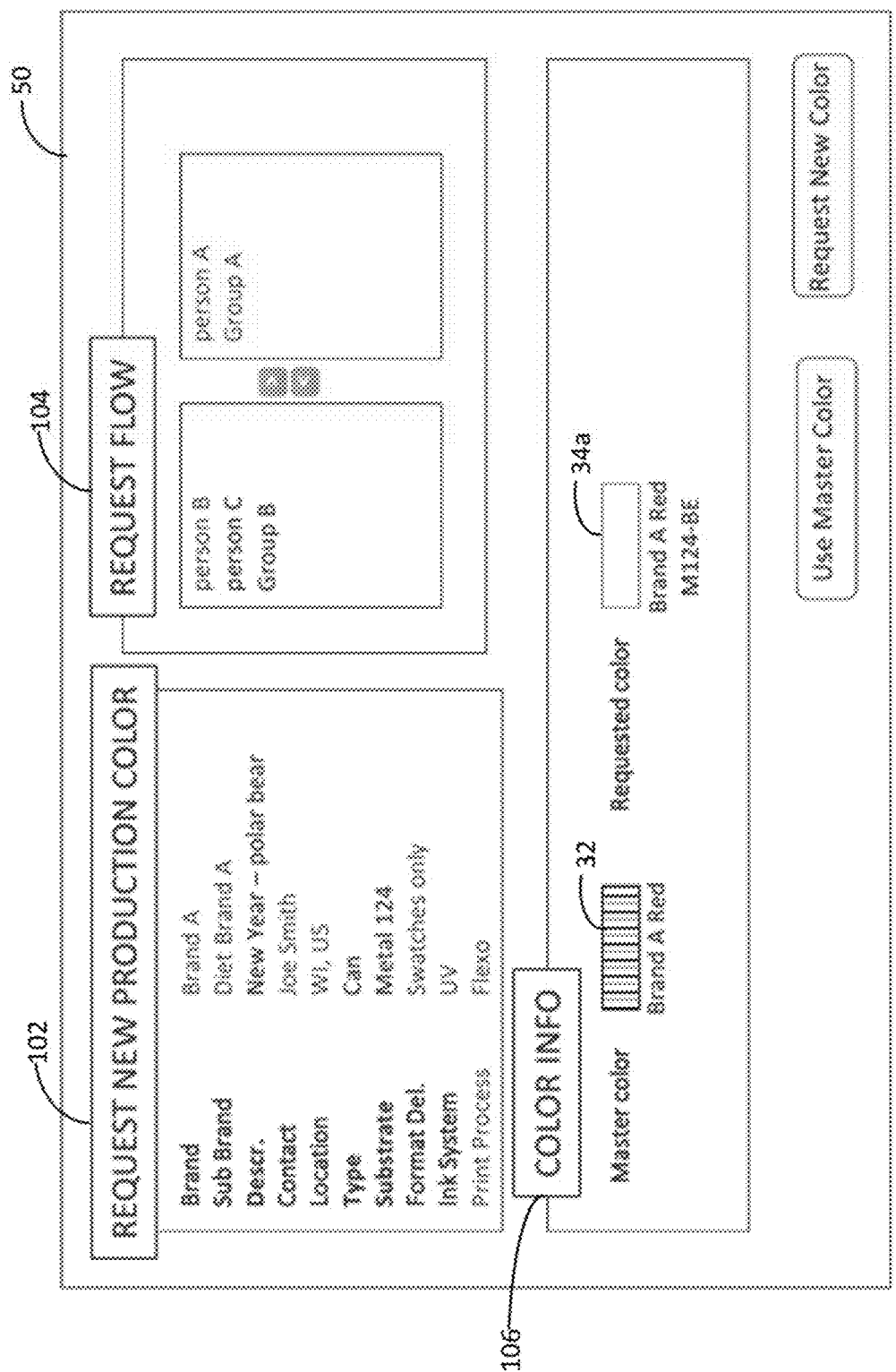
FIG. 13 is a representation of a screen display illustrating initiation of a request of absent production color according to another aspect of the present invention.

Checking for the existence of Quality Assurance colors occurs in step 214. Referring to FIG. 13, in the event that a Production Color 34a (FIG. 12) does not exist for a Master Color 32 in the Color Data 38, the Buyer 20 may decide to generate 242 (FIG. 18) a new Production Color 34 and use the System 10 to generate a Request 102 for the development of a new Production Color 34. The Request 102 includes a Master Color, a printed product type, a print process, and a substrate for the printed product. In some embodiments, the Request may further specify a particular Converter 28 a particular printing plant or a particular ink base. In the illustrated example, the check for Production Colors 34 occurs after Artwork 44 has been generated and approved. In other examples, the check for Production Colors 34 may occur as early as soon as the Palette 30 is selected. The development of Dependent Standard Color libraries handled separately from this workflow.

Referring to FIG. 13, the persons involved in the development of a new Production Color 34 may be pre-selected in request flow 104 with the ability to make manual changes if desired. Color information 106 including the Master Color(s) at issue is also provided. When the Request New Color button is selected, the System 10 sends the request to people in the request.

Figure 14:
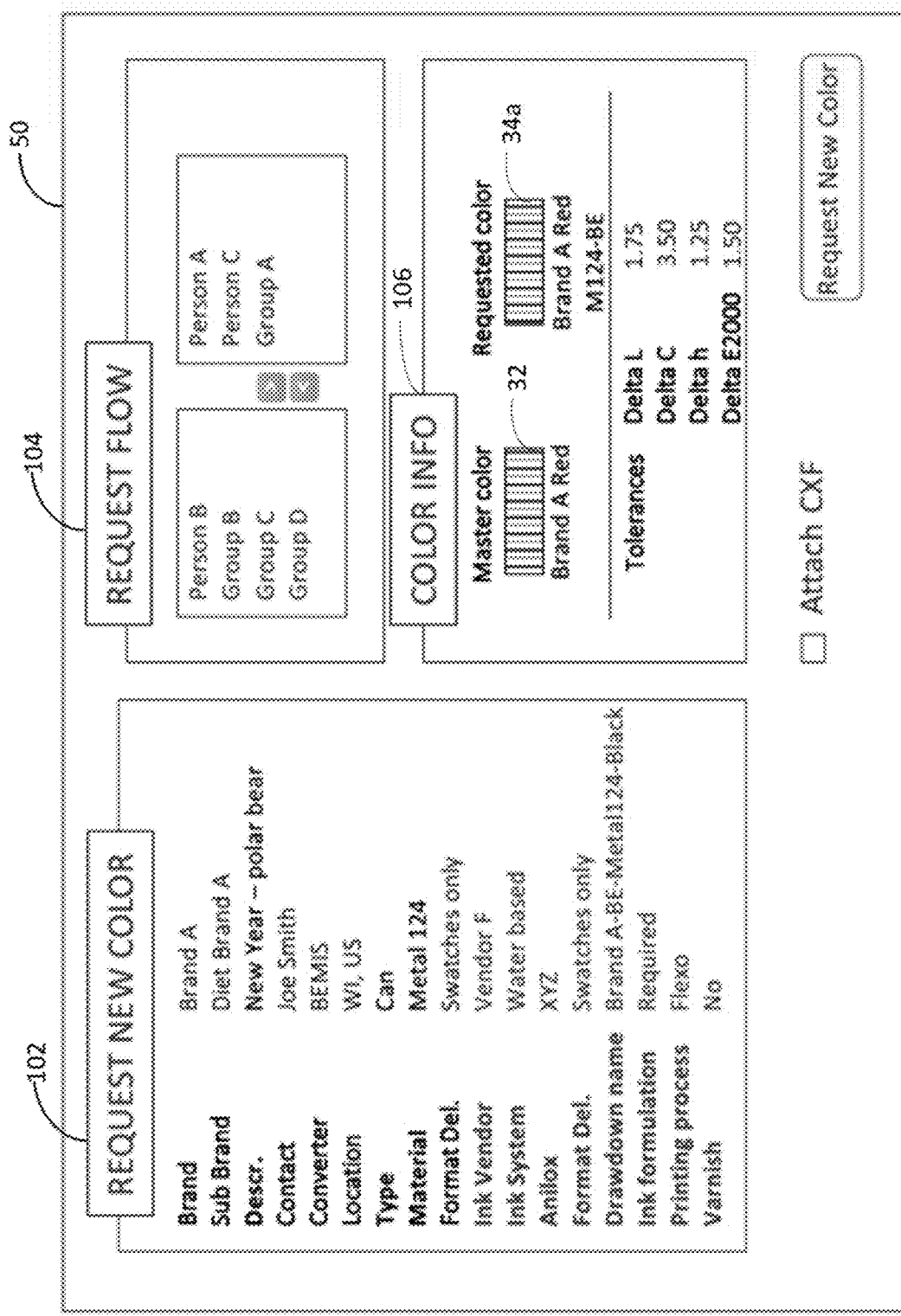
FIG. 14 is a representation of a screen display illustrating details of a request of absent production colors according to another aspect of the present invention.

Referring to FIG. 14, depending on the Request 102, an ink vendor, a printing plant, pre-media, may be involved in preparation of one or more samples for measurement will be involved in the new color process. The Request 102 comprises printing conditions, including printing process, substrate, and ink base. A decision is made 244 whether to request a spot color or a process color. A Color Expert 22 can edit some fields that are too technical for the Buyer 20 but required for the ink vendor. The System 10 sends the Request to people in the request flow. This may occur by email or any appropriate messaging technique.

Figure 15:
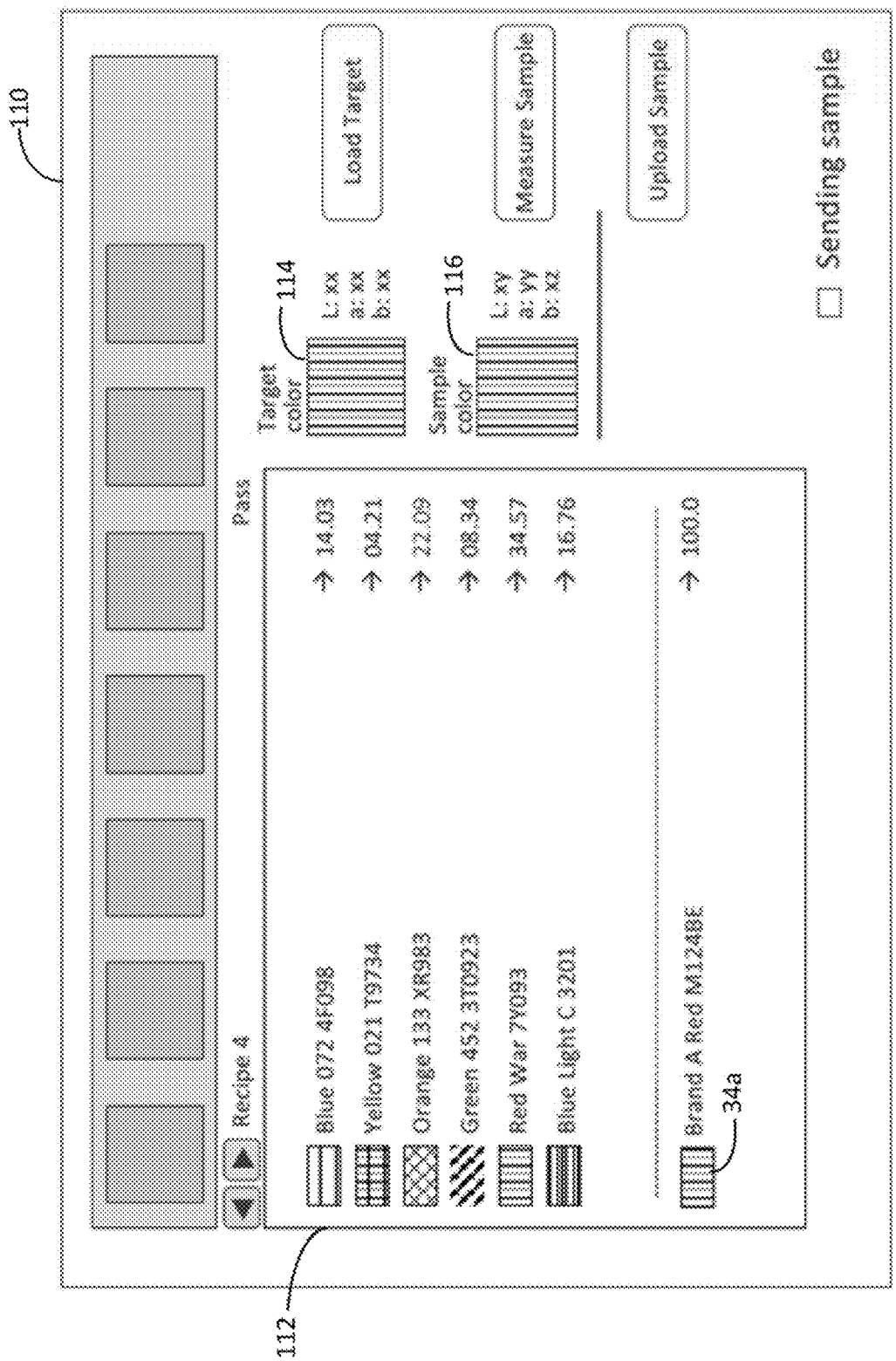
FIG. 15 a representation of a screen display for spot ink formulation development.
Figure 16:
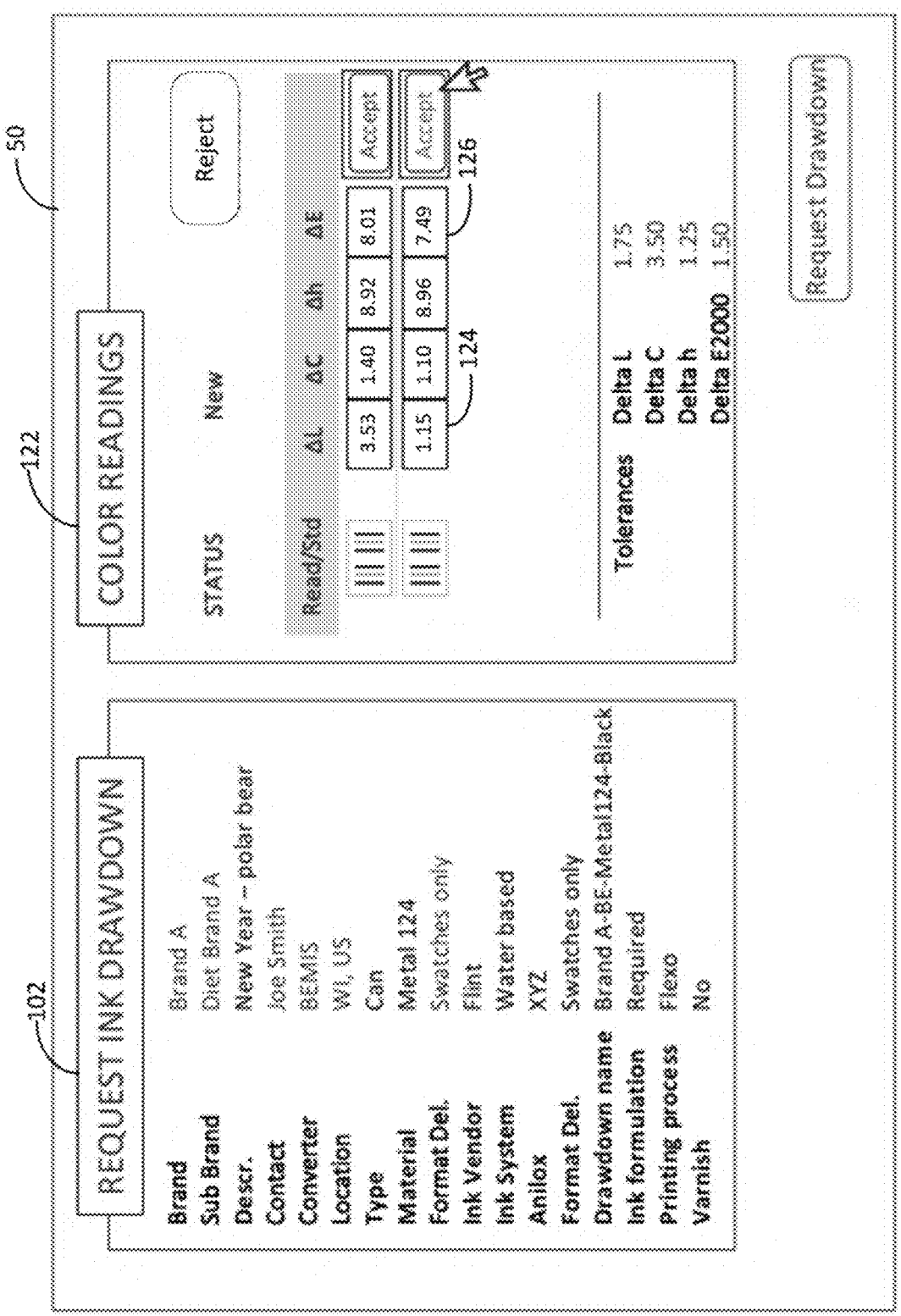
FIG. 16 is a representation of a screen display illustrating receiving color measurements responsive to a request of absent production colors according to another aspect of the present invention.
Figure 17A:
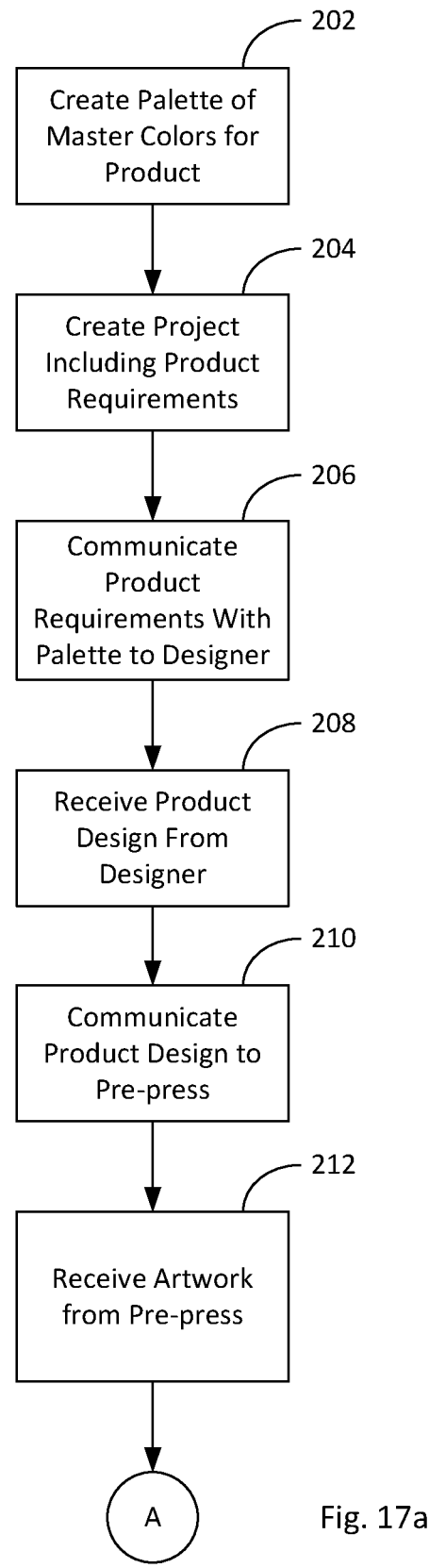
FIGS. 17a and 17b are a flow chart of using the system of the present invention for the development and production of a printed product according to another aspect of the present invention.
Figure 17B:
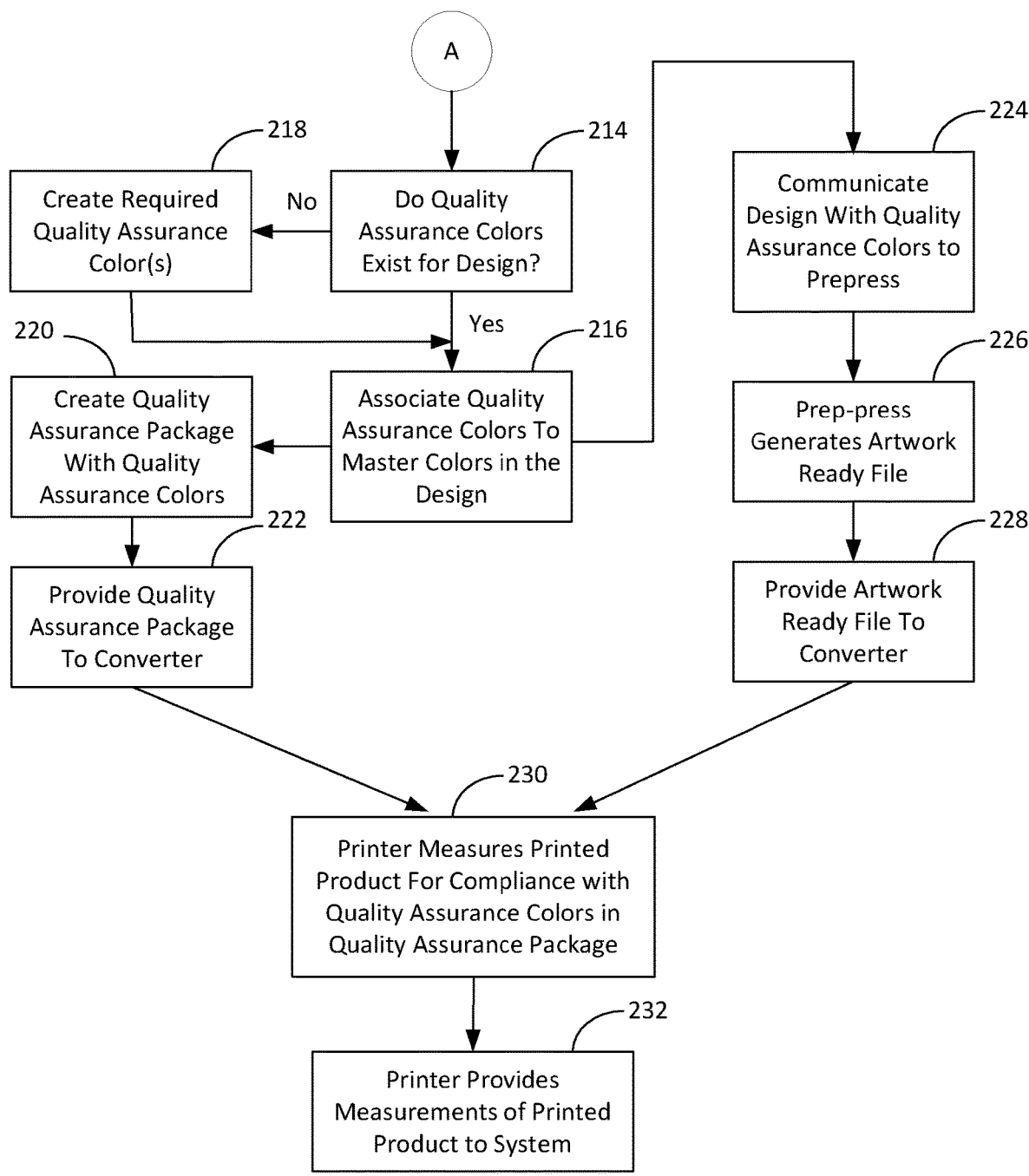
Figure 18:
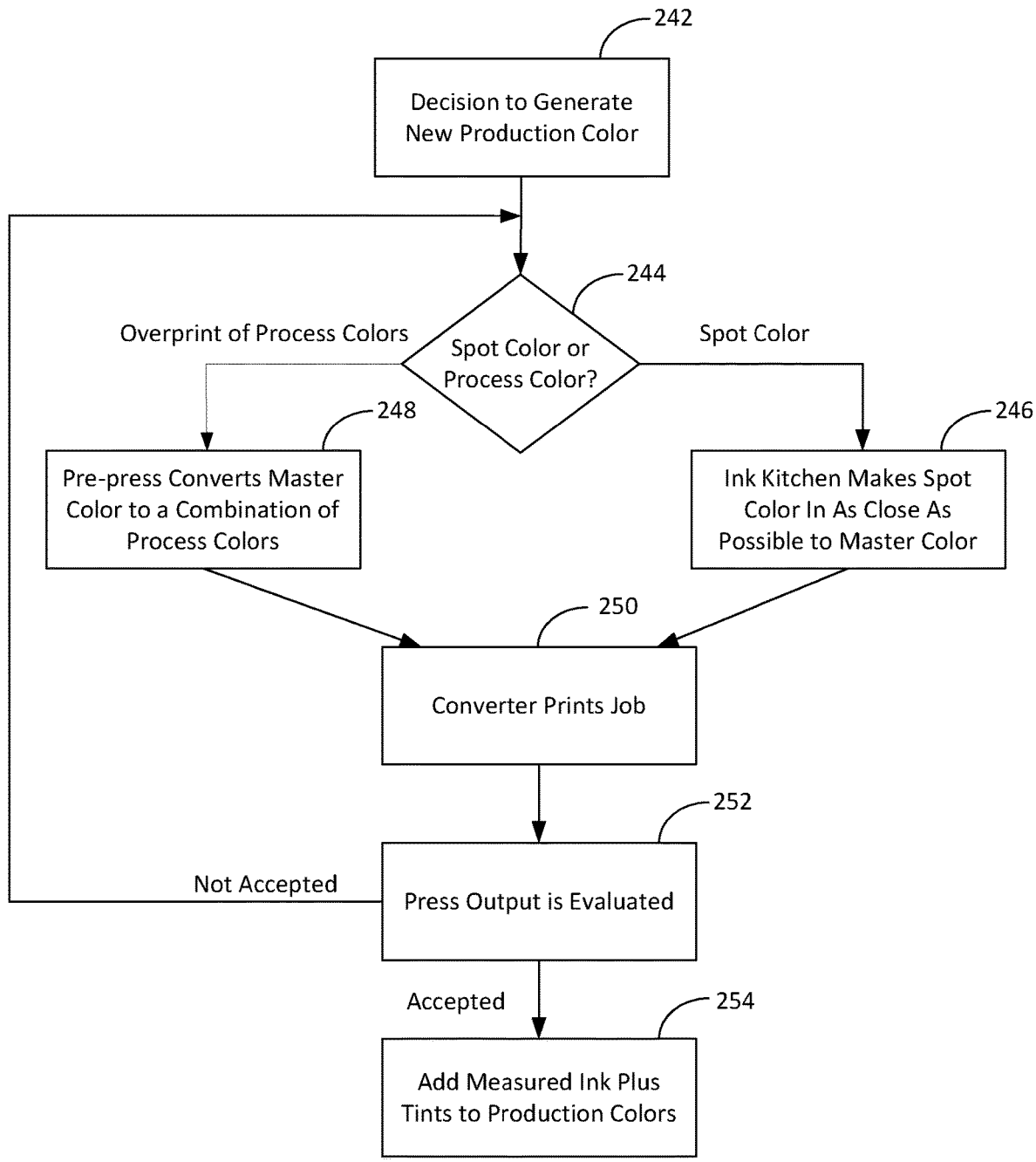
FIG. 18 is a flowchart of a process for requesting a production color corresponding to a master color according to another aspect of the present invention.

Referring to FIGS. 15, 16 and 18, in one example of developing a new Production Color 34, the Converter 28 loads a target color 114 (in this case a Master Color 32) into an ink formulation application 110, such as X-Rite Ink Formulation Software, which produces an ink recipe 112 to produce a spot color 246 based on the printing conditions, including printing process, substrate, and ink base. In another example, instead of formulating a spot color, a CMYK process may be employed, and the Production Color 34 would reflect the closest match achievable with the CMYK process. In this case, pre-press converts the Master Color 32 to a combination of process colors 248.

The Converter 28 prints a sample 250 and measures the color/spectral information to determine whether the sample 116 is within an allowable tolerance of the target Master Color. Color Readings 122 are provided in the System 10. The Color Readings include color difference 124 and delta E 126 values. The press output is evaluated in step 252. In some cases, the output will be considered not acceptable and portions of the process repeated with adjustments to better match the Master Color 32. In some examples, the Buyer 20 will be present at the printer/converter or receive sample prints by courier to visually inspect the sample prints. Human perception of colors may comprise important acceptance criteria. When a sample is approved, the samples spectral and/or color properties are measured.

The measured Production Color 34 is uploaded to the System 10. In some embodiments, the System 10 accesses Cloud Repository 14 stores 254 the Production Color 34 in the Buyer's proprietary Ink Book where it may be linked with its respective Master Color 32. The link may be stored in the Ink Book. Additional printing conditions, such as ink recipe, Converter 28 and other detailed printing conditions, may also be uploaded and associated with the Production Color 34.

More than one sample may be made and uploaded to the System 10. The Buyer 20 may approve, reject, or select a sample to represent the Production Color 34. For any given Master Color 32, different Production Colors 34 may be generated and associated with different Convertors 28. Once a Production Color 34 is approved or selected, the System adds it to the Buyer's color Library 36 or Ink Book. This includes adding the measured ink+tints to the Production Color 34 for this Converter 28 and printing condition. The Production Color 34 is owned by the brand owner. The mapping between the Master Color 32 and the Production Color 34 is kept for each Production Color 34 inside the definition of the Production Color 34. In this way the System builds a mapping that can be reused when the same Master Color 32 needs to be printed at the same Converter 28 with the same printing condition. Also, the Buyer 20 can specify Production Colors 34 specific to the Buyer's products and choices of materials and Converter 28. Finally, there is no need to build out extensive Production Color libraries, as Production Colors 34 specific to a Brand's Palette 30 may be generated on an as-needed basis.

The Ink Books may be accessed through a file explorer in the System. The Buyer/Brand Owner 20 is able to see all Ink Books to which the Buyer 20 has access through the file explorer. The file explorer may include visual indicators of the status of each Ink Book. For example, a green indicator may indicate that an Ink Book is up to date and an orange indicator may indicate that a newer version is available.

The above invention allows the Buyer 20 to have access to the Production Colors 34 associated with its Master Colors 32, along with detailed printing conditions used to achieve the colors in production. The Buyer 20 also has access to key performance indicators, such as color accuracy achieved by individual converts, on a project by project basis. The Buyer 20 may share this information with persons in the product development workflow on an as needed basis. This helps maintain and improve consistency of product appearance across different regions and Printers/Converters 28.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method of producing a printed product according to a project specification, comprising:
   creating a project specification and storing the project specification on a server, the project specification including a palette of selected master colors, a printing substrate, a printing technique and an ink base for a printed product;
   determining whether a quality assurance color is available for each master color;
   for master colors having an associated quality assurance color, automatically associating quality assurance color information with the master colors;
   generating a quality assurance package corresponding to the project specification, the quality assurance package including the quality assurance color information;
   providing a converter with access to the project specification and the quality assurance package;
   the converter producing the printed product according to the project specification and scoring the printed product against the quality assurance color information in the quality assurance package; and
   receiving from the converter a score indicative of the printed product's appearance measured against the quality assurance package.

2. The method of claim 1, wherein the server performs the step of automatically associating quality assurance color information.

3. The method of claim 1, wherein the quality assurance color comprises a production color previously generated by the converter.

4. The method of claim 1, wherein the step of automatically associating quality assurance color information comprises associating color space values or spectral information for the quality assurance colors with the master colors.

5. The method of claim 1, wherein the quality assurance color comprises a dependent standard color hosted in a separate database.

6. The method of claim 1, wherein the step of automatically associating quality assurance color information comprises associating a reference to where color space values or spectral information for the quality assurance colors may be accessed.

7. The method of claim 1, further comprising providing access to the project specification to a pre-press operator prior to the step of generating a quality assurance package.

8. The method of claim 7, wherein the pre-press operator performs the step of automatically associating quality assurance color information.

9. The method of claim 1, further comprising the step of the server automatically generating a request for a new quality assurance color for master colors that have no corresponding quality assurance color.

10. The method of claim 1, further comprising the step of the server automatically checking that a design uploaded to the project specification only includes colors from the palette of selected master colors.

11. The method of claim 1, wherein the quality assurance package excludes the master colors in the palette of selected master colors.

12. The method of claim 1, wherein the step of receiving from the converter a score further comprises:
   the converter uploading the score to a score server separate from the server, and
   the server accessing the score server and retrieving the score.

13. The method of claim 1, further comprising the steps of:
   providing a designer with access to the project, including the palette of selected master colors;
   receiving from the designer a product design; and
   verifying the product design uses only the colors in the palette of selected master colors.

* * * * *